United States Patent [19]
Johnson

[11] 4,243,192
[45] Jan. 6, 1981

[54] BALL PIVOT THRUST BEARING FLEX JOINT

[75] Inventor: Robert E. Johnson, Los Alamitos, Calif.

[73] Assignee: McDonnell Douglas Corporation, Long Beach, Calif.

[21] Appl. No.: 966,337

[22] Filed: Dec. 4, 1978

[51] Int. Cl.³ .......................... B64C 3/50; B64C 1/00
[52] U.S. Cl. ..................... 244/215; 244/46; 244/131; 308/72; 403/131; 403/158
[58] Field of Search ............... 244/46, 48, 117 R, 131, 244/213, 215, 217; 308/72, 140, 141; 403/122, 131, 143, 157, 158

[56] References Cited

U.S. PATENT DOCUMENTS

| | | | |
|---|---|---|---|
| 2,766,079 | 10/1956 | Browne | 403/131 |
| 2,995,813 | 8/1961 | Board | 308/72 |
| 3,198,563 | 8/1965 | Steidl | 308/72 |
| 3,445,908 | 5/1969 | Straub | 308/72 |
| 3,516,136 | 6/1970 | Carter et al. | 308/72 |

FOREIGN PATENT DOCUMENTS

| | | | |
|---|---|---|---|
| 743267 | 1/1956 | United Kingdom | 244/131 |
| 1302172 | 1/1973 | United Kingdom | 244/46 |

Primary Examiner—Charles E. Frankfort
Attorney, Agent, or Firm—Paul T. Loef; Walter J. Jason; Donald L. Royer

[57] ABSTRACT

A ball pivot thrust bearing flex joint assembly having an inner race member and an outer race member, the inner surface of the outer race member being a concave spherical self lubricating surface which provides a maximum envelopment of the complementary convex spherical outer surface of the inner pivoting ball race. The inner race ball is provided with a through aperture along the axis of primary motion for acceptance of a through shaft or bolt, and is provided with integral lateral extensions which are necked down to provide clearance for secondary axis motion. The end portions of the through hole aperture are provided with self lubricating bearings which support the radial loads and accommodate main axis rotation. Flat, washer type, self lubricating bearings are provided between the ends of the inner race pivoting ball and the associated clevis. Thus high thrust loads are accommodated with limited secondary axis motion about the complementary spherical surfaces and primary motion is accommodated about the shaft or bolt center line radial bearings.

10 Claims, 4 Drawing Figures

BALL PIVOT THRUST BEARING FLEX JOINT

BACKGROUND OF THE INVENTION

This invention pertains to a flexible joint joining two moveable, independently hinged, aircraft surfaces and, more particularly, to a flex joint employing a spherical bearing.

Modern aircraft lift surfaces, e.g. a swept wing, may have a trailing edge whose plan view projection is two intersecting lines. In order to provide a continuous, faired flap or moveable surface of equal chord length beyond the intersection in the trailing edge, it is necessary to accommodate two contiguous flap segments which rotate about different hinge lines. In addition to the fairing problem, it is necessary to join the two flap segments with a suitable flexible link capable of transmitting point loads, while rotating about several axes, in order to keep the two flap sections moving at the same rate. Each flap section is actuated by two hydraulic cylinders. One cylinder from each section is supplied by one hydraulic system and the remaining two cylinders from another. If one hydraulic system fails, each flap section is actuated by a single cylinder from a common supply and the point loads across the flexible joint become quite high.

Spherical roller bearings, when subjected to high thrust loads, have a tendency to screw out the rollers and inner race due to their inherent geometry. Self-aligning spherical bearings with the bearing surface made from fabric lining such as Teflon (polytetrafluoroethylene) are used extensively in aircraft service where surface speeds are low and load factors are moderate. Spherical bearings are particularly attractive as they can be designed to provide long life, self lubrication, self-alignment, and generally do not experience catastrophic type failures, e.g. seizure. However, spherical bearings, while capable of carrying some thrust load, are inherently radial bearings. Furthermore, the outer race of the spherical bearing is difficult to support when subjected to high thrust loads.

A ball pivot thrust bearing was invented that effectively joins two adjacent, independently hinged moveable control surfaces structurally.

SUMMARY OF THE PRESENT INVENTION

It is an important object to the present invention to provide a low friction, wear durable, mechanically fastened, yet flexible structural joint to buss or join two contiguous aerodynamic surfaces which rotate about oblique hinge lines.

In summary, the flexible joint of this invention accomplishes the above objects and overcomes the disadvantages of prior devices by providing a spherical bearing capable of carrying high thrust loads in combination with radial and thrust bearings. Sleeve bearings are provided in the bore of the inner race along with thrust bearings between the cylindrical extension of the inner race ball and the supporting clevis to accommodte motion about the principal axis. Motion takes place about these surfaces, as opposed to the spherical surface, because the effective radius of these bearings is less than that of the sphere and surface materials are similar, so coefficients of friction are similar. The joint is oriented so that maximum motion occurs about the principal axis which turns on bearings separate from the spherical surface and misalignment only is accommodated by motion on the spherical surface, which minimizes wear on the spherical surface materials. Positive structural means are provided to retain the link structure on the outer race of the spherical bearing.

BRIEF DESCRIPTION OF THE DRAWINGS

With reference to the drawings, wherein like reference numerals designate like portions of the invention.

DETAILED DESCRIPTION OF THE PREFERRED EMBODIMENT

Figure 1:
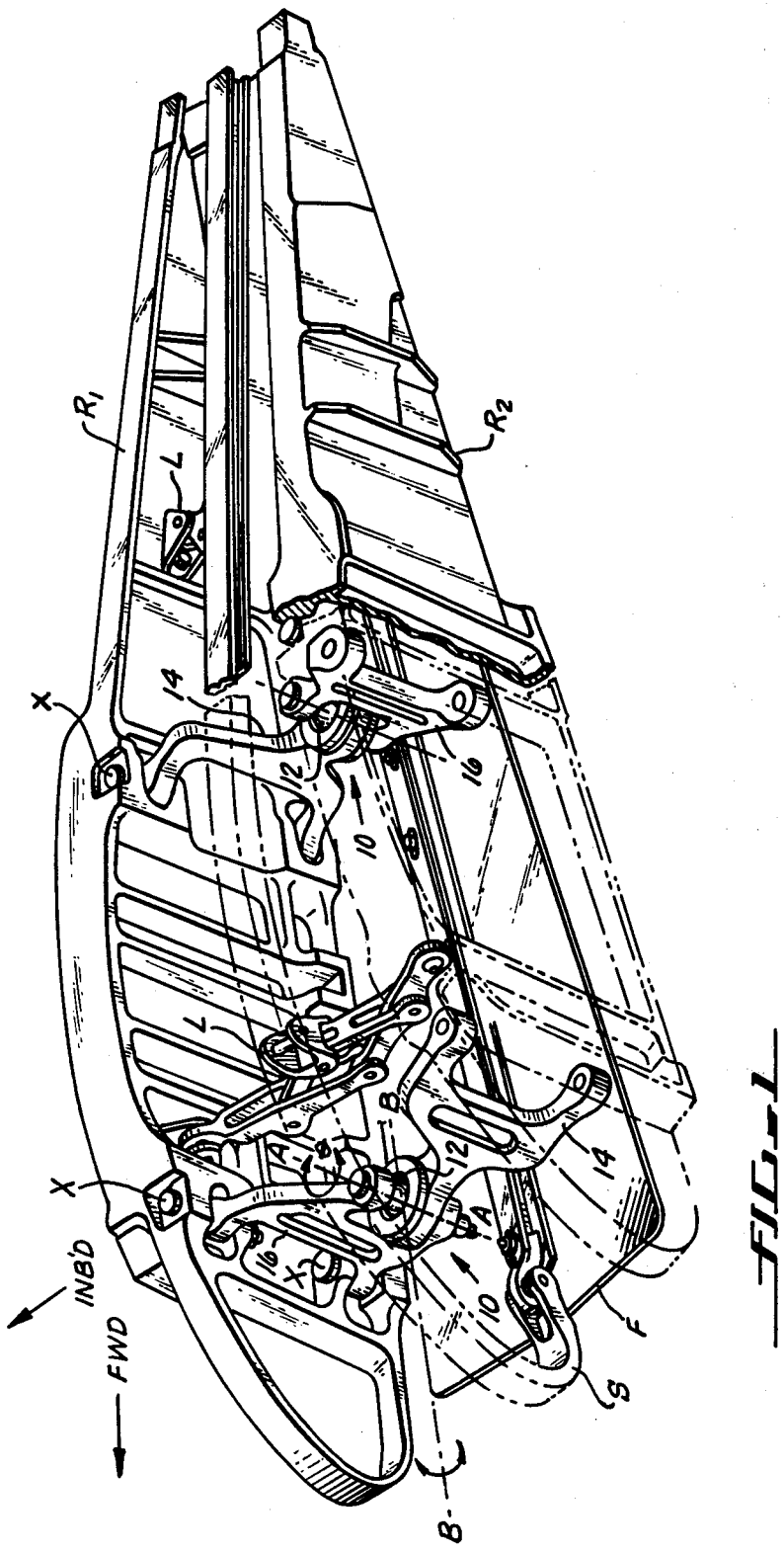
FIG. 1 is a perspective view of the intersection between two contiguous flap segments rotated on oblique hinge lines with the flap skin and the fairing section between the two flap sections, along with a portion of structure, removed for clarity, showing two of the flexible joints of this invention installed.

The preferred embodiment is shown in assembled configuration in FIG. 1 and installed in an aircraft segmented flap in which each flap segment rotates about a different axis. The main wing portion which sits forward of the flap has been omitted in its entirety for clarity. The rib R1 is the closing bulkhead of the inboard flap which is connected to the outboard flap closing bulkhead R2 by the ball pivot thrust bearing flex joints 10. In-between the two flap segments is a spine S which supports a lower fairing F and an upper fairing which has been removed for purposes of clarity. The upper fairings is supported by a pair of linkages shown as L. The fairing, of course, encloses the space between the two flap segments.

The ball pivot thrust bearing flex joint 10, which will be described in detail infra, consists essentially of a spherical bearing 12, a ball link 14 and a clevis link 16. The links 14 and 16 are attached to the rib structures R1 and R2 typically as at X. The flex joint is oriented so that maximum rotation takes place about the principal axis A—A. Motion about any axis perpendicular to the principal axis, e.g. B—B simply accomodates misalignment, is minimal, and is referred to herein as the secondary axis. Principal loads occur parallel to the axis A—A so as to impose a thrust load on the spherical bearing 12 with secondary, minor loads occuring perpendicular to the axis A—A.

Figure 2:
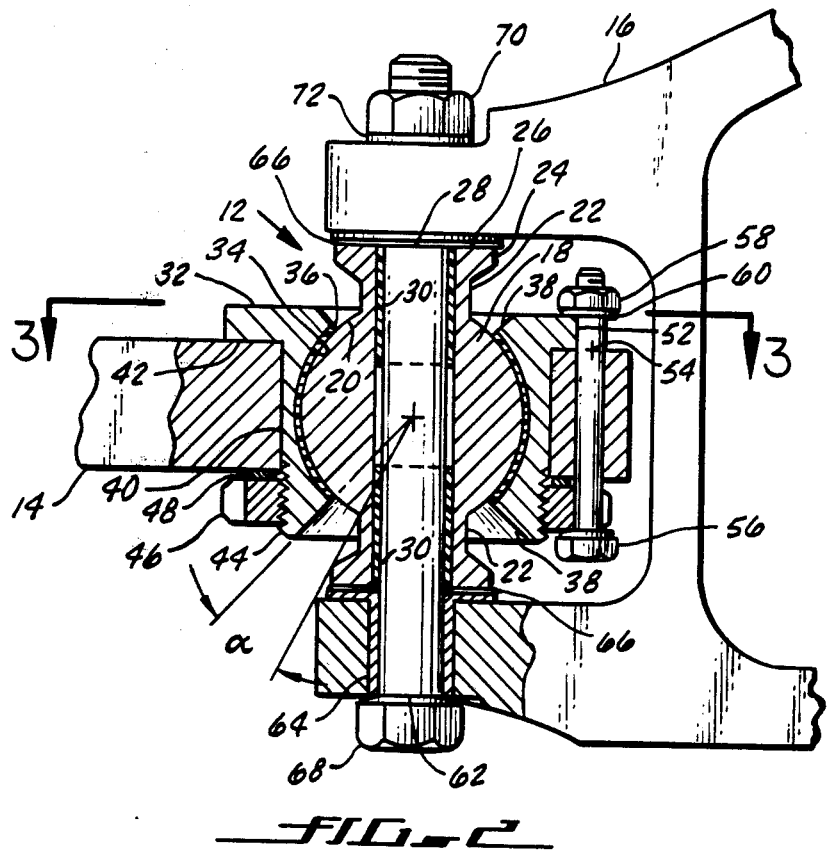
FIG. 2 is a view of the flexible joint with the spherical bearing and portions of the two attaching structural members shown in section.
Figure 3:
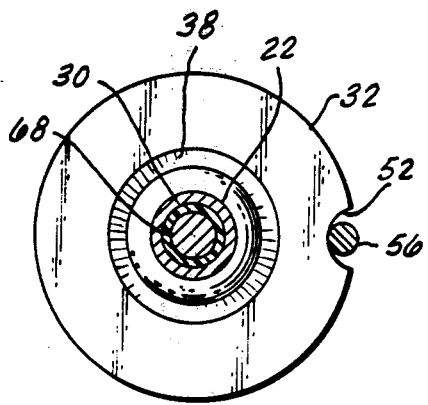
FIG. 3 is an end view of the spherical bearing taken at line 3—3 of FIG. 2.

Referring to FIG. 2, the details of the ball pivot thrust bearing joint assembly follow. The spherical bearing 12 has an inner or ball race 18. The inner race 18 consists of a convex spherical outer surface 20, which terminates about an axis of the spherical surface in cylindrical extensions 22, which are necked down for clearance. The extension then terminates in an enlarged diameter 24, having a flat end 26. A bore 28 is provided in the center of the inner race 18 and accommodates a pair of radial bearings 30. Enveloping the spherical outer surface 20 of the inner race 18 is the outer race 32 of the spherical bearing 12. The outer race 32 has a concave spherical surface 34, generally complementary to the convex spherical outer surface 20 of the inner race 18. In one embodiment a Teflon fabric liner 36 is bonded to the concave spherical surface 34, which provides a self-lubricating surface against the sphere 20. Alternative liner materials may be used or the spherical metallic surface 34 may engage the matallic spherical outer surface 20 of the inner race 18 directly if adequate lubrication is provided. The concave spherical surface 34 terminates in a chamfer at 38, typically both ends. Outer race 32 has a cylindrical outer surface 40 which terminates one end in a shoulder 42 and the other distal end in a thread 44.

Figure 4:
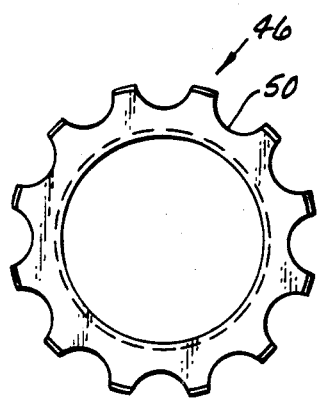
FIG. 4 is an end view of the nut used to retain the structural member on the outer race of the spherical bearing.

Ball link 14 slips over the cylindrical surface 40 of the outer race 32, butts agains the shoulder 42, and is secured thereto by a nut and washer 46 and 48. An end view of the nut 46 as shown in FIG. 4. Nut 46 is provided at its outer circumference with a series of equally spaced semi-circular cutouts 50. It is important that the nut 46 not be drawn up too tightly so as to distort the concave spherical surface 34 of the outer race 32. However, the nut 46 must be adjusted so that one of the cutouts 50 aligns with the relief 52 provided in the shoulder 42 of the outer race 32 and the bore 54 provided in the ball link 14 so as to accommodate the lock bolt 56. Lock bolt 56 is secured with a nut 58 and washer 60.

While not a subject of this invention, the concave spherical surface 34 is prepared by machining one half of the spherical surface, inserting the complementary mating inner race 18 and swaging the remaining end portion of the outer race 32 about the convex spherical surface 20 of the inner race 18. The outside of the outer race is then finish machined.

A through bore at 62 is provided in the clevis link 16 to accommodate flange bearings 64. Bonded to the flange portion of the flange bearing 64 is a self-lubricating surface, e.g. teflon, which engages the flat end 26 of the inner race 18 and behaves as a thrust bearing 66. Inserted through the ID of the flange bearings 64 and the radial bearings 30 contained in the bore 28 of the inner race 18 is a through bolt 68, which is secured at its distal end with a lock nut and washer 70 and 72.

The particular embodiment shown provides for 360° rotation about the principal axis and 12° rotation about the secondary axis shown in FIG. 2 as the angle α. The bearing is designed for 80,000 cycles of ± 90° about the principal axis and ±10° about the secondary axis with a thrust load of 3,720 lb and a radial load of 372 lb.

The present invention provides a ball pivot thrust bearing flex joint assembly which permits full rotation about the principal axis, 12° about the secondary (misalignment) axis and accommodates thrust loads (loads parallel to the principal axis) 10 times the radial loads on self-lubricated surfaces. The flex joint structurally joins or busses two contiguous aerodynamic surfaces which rotate about oblique hinge lines.

While the present invention has been disclosed in connection with the preferred embodiment thereof, it should be understood that there may be other embodiments which fall within the spirit and scope of the invention defined by the following claims.

What is claimed is:
1. In an airplane, a flexible joint comprising:
an outer race, said outer race having a concave, truncated spherical inner surface which terminates in a circle at the plane of the truncation and a cylindrical outer surface;
an inner race, said inner race having a convex spherical outer surface is complimentary,, sliding engagement with said concave inner surface of said outer race, said convex spherical outer surface terminating about an axis in lateral cylindrical extensions provided with necked down sections followed by an enlarged flange essentially equal in diameter to the diameter of said circle at the plane of truncation of said spherical inner surface of said inner race and terminating perpendicular to said axis so as to provide rotational clearance for said outer race oblique to said axis while providing an enlarged bearing surface, and with a through bore provided on said axis;
a radial bearing provided in said bore; and
thrust bearing means engaging said enlarged flange ends of said lateral, cylindrical extensions of said inner race whereby rotation about said axis takes place about said radial and thrust bearings and motion oblique to said axis takes place about said spherical surfaces.

2. The flexible joint of claim 1 wherein said outer surface of said outer race terminates at one distal end in a shoulder and the other distal end in means to receive a fastener.

3. The flexible joint of claim 1 further comprising clevis link means engaging said thrust bearing means, ball link means circumscribing said outer race, and a bolt through said clevis link means, said thrust bearing means and said bore in said inner race.

4. The flexible joint of claim 1 wherein said outer race is provided with a chamfer at the terminations of said concave, spherical inner surface whose angle is such that when said outer race is rotated to its limits at an oblique angle with respect to the axis of said inner race, said chamfer is parallel to said necked down section of said lateral cylindrical extensions of said spherical surface of said inner race.

5. The flexible joint of claim 1 wherein said outer race concave, spherical inner surface, said radial bearings and said thrust bearing means are made from self-lubricating materials.

6. The flexible joint of claim 5 wherein said self-lubricating material is TEFLON.

7. In an airplane, a flexible structural joint for bussing two contiguous, segmented aerodynamic surfaces which rotate about oblique hinge lines, comprising:
an outer race, said outer race having a concave, spherical, self-lubricating inner surface and a cylindrical outer surface which terminates at one distal end in a flange and the other distal end in means to receive a fastener;
an inner race, said inner race having a convex spherical outer surface in complimentary, sliding engagement with said concave inner surface of said outer race, said convex spherical outer surface terminating about an axis in lateral cylindrical extensions provided with necked down sections to provide rotational clearance for said outer race oblique to said axis and with a through bore provided on said axis;
a self-lubricating radial bearing provided in said bore;
thrust bearing means engaging the ends of said lateral, cylindrical extensions of said inner race,
clevis support means engaging said thrust bearing means;
a ball link means circumscribing said outer race, abutting said flange, and secured thereto by a fastener; and
a bolt through said clevis support means, said thrust bearing means and said bore in said inner race.

8. The flexible structural joint of claim 7 wherein said outer race concave spherical inner surface, said radial bearing and said thrust bearing means are made from TEFLON fabric.

9. The flexible structural joint of claim 7 wherein said means to receive a fastener on said distal end of said outer surface of said outer race is a thread and said flexible joint further comprises a nut on said thread with locking means.

10. The flexible joint of claim 7 wherein said outer race is provided with a chamfer at the terminations of said concave, spherical inner surface whose angle is such that when said outer race is rotated to its limits at an oblique angle with respect to the axis of said inner race, said chamfer is parallel to said necked down section of said lateral cylindrical extensions of said spherical surface of said inner race.

* * * * *